(12) United States Patent
Zebrowski et al.

(10) Patent No.: US 8,666,632 B2
(45) Date of Patent: Mar. 4, 2014

(54) DISTRIBUTED AIRCRAFT ENGINE FUEL SYSTEM

(75) Inventors: Thaddeus J. Zebrowski, Windsor, CT (US); Richard E. Versailles, New Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 281 days.

(21) Appl. No.: 13/090,412

(22) Filed: Apr. 20, 2011

(65) Prior Publication Data

US 2012/0271527 A1 Oct. 25, 2012

(51) Int. Cl.
*G06F 19/00* (2011.01)
(52) U.S. Cl.
USPC ................. 701/100; 60/745; 60/747
(58) Field of Classification Search
USPC .................... 701/100; 60/746, 747
See application file for complete search history.

(56) References Cited

U.S. PATENT DOCUMENTS

| | | | |
|---|---|---|---|
| 6,637,184 B2 | 10/2003 | Freeman | |
| 6,655,152 B2 | 12/2003 | Griffiths et al. | |
| 7,137,613 B2 | 11/2006 | Jansen | |
| 7,216,487 B2 * | 5/2007 | Parsons | 60/773 |
| 7,472,540 B2 | 1/2009 | Berenbrink et al. | |
| 7,520,260 B2 | 4/2009 | Nakamura et al. | |
| 7,654,092 B2 | 2/2010 | Ryan et al. | |
| 7,845,177 B2 | 12/2010 | Parsons | |
| 2003/0136105 A1 * | 7/2003 | Freeman | 60/39.281 |
| 2005/0066649 A1 * | 3/2005 | Lorenz | 60/39.281 |
| 2009/0077945 A1 * | 3/2009 | Cornwell et al. | 60/39.281 |

OTHER PUBLICATIONS

James E May, "Active Pattern Factor Control for Gas Turbine Engines," from http://www.grc.nasa.gov/WWW/RT/RT1997/5000/553may.htm, visited on Feb. 9, 2011, 3 pages.

* cited by examiner

*Primary Examiner* — James Trammell
*Assistant Examiner* — Jerrah Edwards
(74) *Attorney, Agent, or Firm* — Kinney & Lange, P.A.

(57) ABSTRACT

A gas turbine engine includes a plurality of fuel injectors grouped operatively by stages in a multistage combustor. A fuel system for the gas turbine engine includes at least one fuel metering module per stage of the multistage combustor. Each fuel metering module includes a pump, a flow meter, a pressure sensor, a controller, and a motor, which work together to control fuel output.

15 Claims, 5 Drawing Sheets

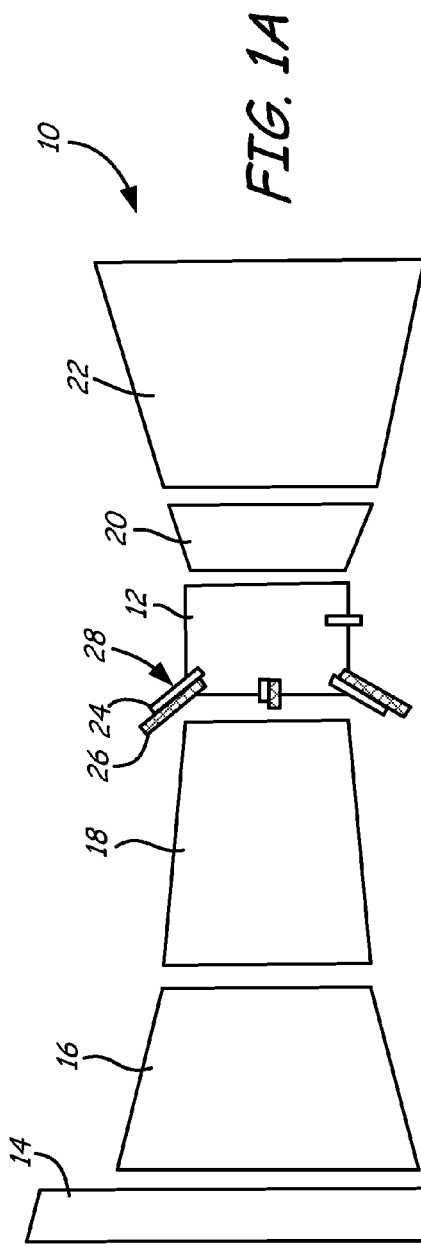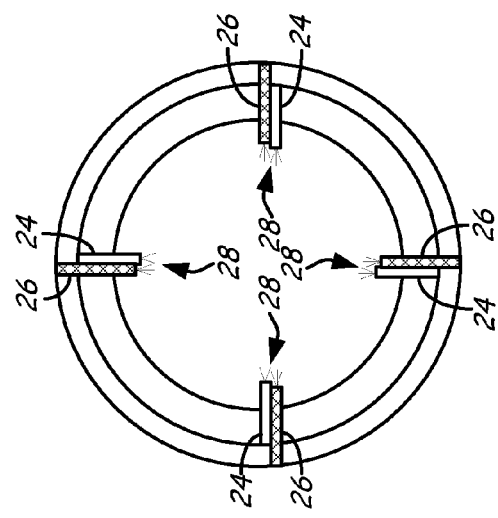

DISTRIBUTED AIRCRAFT ENGINE FUEL SYSTEM

BACKGROUND

The present disclosure relates to a fuel system for delivering fuel to a gas turbine engine.

A typical fuel system includes a large pump driven by a turbine engine through a gearbox. In order to achieve desired fuel volumes and pressures for the engine, the pump is specifically oversized for peak demand. As a result, the fuel system includes a bypass valve to return unneeded fuel back to the engine fuel inlet or fuel tank, which is inefficient. The fuel returned to the tank is hot, which undesirably raises the temperature of fuel in the fuel tank. Furthermore, excess pressure is generated that must be relieved by using a pressure relief valve to mitigate any potential burst or over pressure conditions.

In a multistage combustor engine, fuel injectors are arranged into operative groups called "stages". Typically, a single engine-driven pump and metering valve feed fuel to a plurality of fuel distribution lines. Each fuel distribution line includes a staging valve for modulating fuel flow to a single combustor stage, which includes a plurality of fuel injectors. Some fuel systems additionally include temperature sensors proximate the fuel injectors to monitor temperature distribution around the combustor.

SUMMARY

A fuel system for a gas turbine engine having an electronic engine control includes a plurality of fuel injectors grouped by stages in a multistage combustor and at least one fuel metering module per stage of the multistage combustor. Each fuel metering module includes a positive displacement pump for pumping fuel, a flow meter for measuring fuel flow, and a first pressure sensor for sensing fuel pressure. Each fuel metering module further includes a controller for receiving and analyzing information regarding fuel flow from the flow meter, fuel pressure from the first pressure sensor, and fuel demand from the electronic engine control, as well as an electric motor for driving the positive displacement pump in accordance with a signal received from the controller to modulate fuel output for the fuel metering module.

A fuel system for a gas turbine engine includes a fuel tank, a boost pump downstream of the fuel tank, a fuel/oil heat exchanger downstream of the boost pump, and a filter downstream of the fuel/oil heat exchanger. A multistage combustor is located downstream of the filter and includes fuel injectors located in fuel nozzles and operatively organized into stages. A plurality of fuel flow metering modules are located downstream of the filter and upstream of the multistage combustor. The plurality of fuel flow metering modules are configured to control fuel output to one or more fuel injectors in the multistage combustor and operate independently of one another.

A method for distributing fuel in a gas turbine engine having a fuel requirement includes pumping fuel to at least one fuel injector of a multistage combustor and measuring flow rate of fuel while pumping fuel. The method further includes comparing the measured flow rate of fuel with the gas turbine engine fuel requirement and controlling pumping speed based on the comparison between the measured flow rate of fuel and the gas turbine engine fuel requirement to modulate fuel flowing to the at least one fuel injector of the multistage combustor.

BRIEF DESCRIPTION OF THE DRAWINGS

FIG. 1A is a side schematic view of a turbofan gas turbine engine having a multistage combustor.

FIG. 1B is a cross section of the multistage combustor from FIG. 1A.

DETAILED DESCRIPTION

Figure 2:
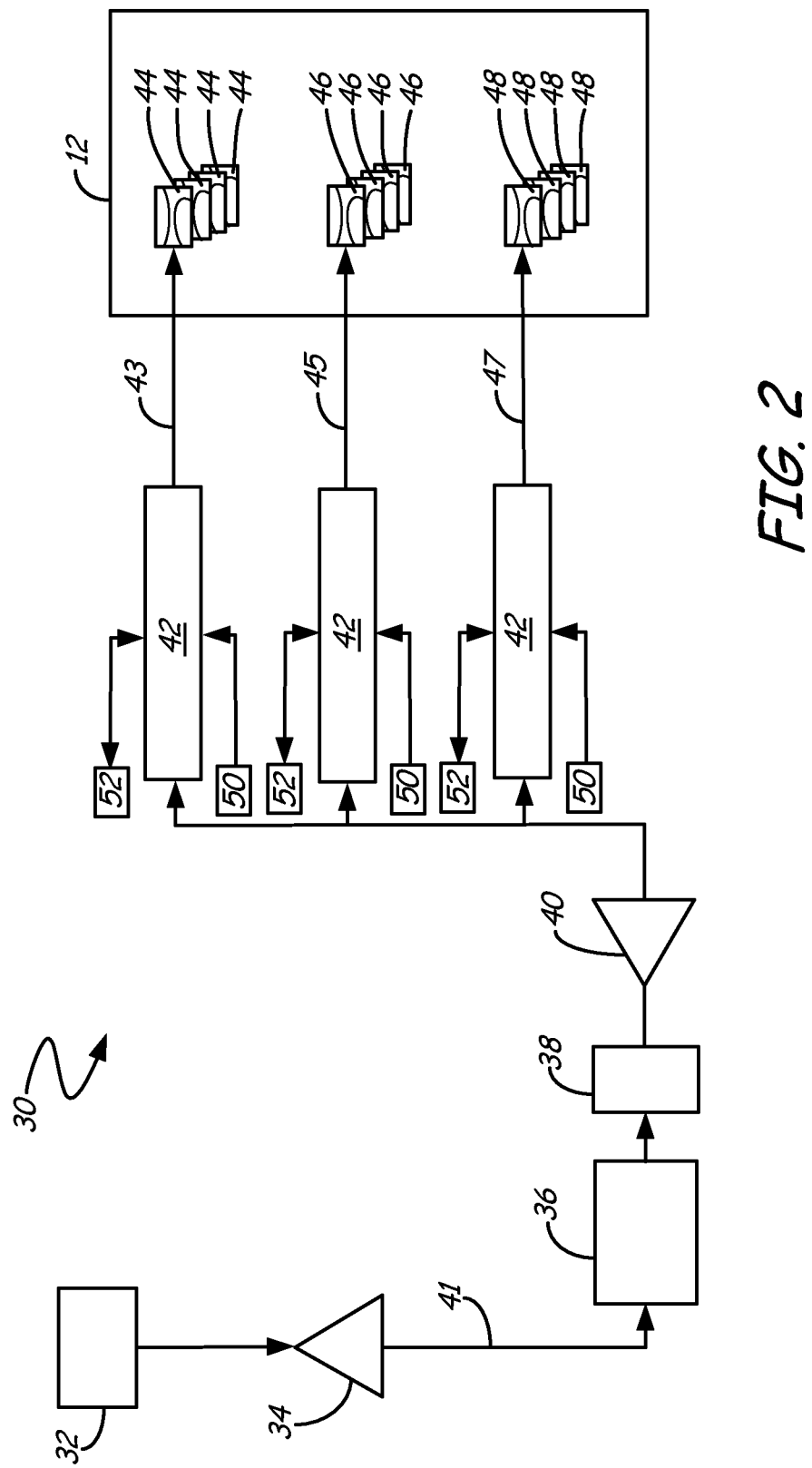
FIG. 2 is a block diagram showing a first embodiment of a fuel distribution system.

FIG. 1A is a side schematic view of gas turbine engine 10 having multistage combustor 12, and FIG. 1B is a cross section of multistage combustor 12. Gas turbine engine 10 includes fan 14, low pressure compressor (LPC) 16, high pressure compressor (HPC) 18, high pressure turbine (HPT) 20, and low pressure turbine (LPT) 22. Multistage combustor 12 includes first stage fuel injectors 24 and second stage fuel injectors 26 located within fuel nozzles 28. In the depicted embodiment, gas turbine engine 10 is a turbofan engine for powering an aircraft, although the invention is not so limited and can be utilized in any gas turbine engine.

Located within gas turbine engine 10 and arranged in flow series are fan 14, LPC 16, HPC 18, multistage combustor 12, HPT 20, and LPT 22. LPC 16 is mechanically coupled to LPT 22 by a low pressure shaft and HPC 18 is mechanically coupled to HPT 20 by a high pressure shaft. In operation, air enters a front end of gas turbine engine 10 at fan 14 and is compressed by LPC 16 and HPC 18. The compressed air then enters multistage combustor 12, where it is mixed with fuel and combusted. Combusted air enters HPT 20 and LPT 22 where it is expanded and forces one or both of the turbines to rotate, which drives fan 14, LPC 16 and HPC 18.

First stage fuel injectors 24 may be physically coupled with second stage fuel injectors 26, such that one first stage fuel injector 24 and one second stage fuel injector 26 form a single fuel nozzle 28. A number of fuel nozzles 28 are located around multistage combustor 12. As shown in the cross section of FIG. 1B, the depicted embodiment includes four first stage fuel injectors 24 and four second stage fuel injectors 26 coupled together to form four fuel nozzles 28. More than two fuel injector stages are possible, as are more or less fuel nozzles 28. First stage fuel injectors 24 spray fuel into multistage combustor 12 either jointly as a first stage operative group, or independently as individual injectors. Similarly, second stage fuel injectors 26 spray fuel into multistage combustor 12 either jointly as a second stage operative group or independently as individual injectors. Fuel flow and control is discussed further below with respect to FIGS. 2-5.

FIG. 2 is a block diagram showing a first embodiment of fuel distribution system 30 for multistage combustor 12. Fuel distribution system 30 includes tank 32, first boost pump 34, fuel/oil heat exchanger (FOHE) 36, filter 38, second boost pump 40, main conduit 41, fuel flow metering modules (FFMMs) 42, first stage conduit 43, first stage fuel injectors 44, second stage conduit 45, second stage fuel injectors 46, third stage conduit 47, and third stage fuel injectors 48. Also shown in FIG. 2 are electric power 50 input and central control 52 input/output for each FFMM 42. Fuel distribution system 30 has one FFMM 42 for each stage of fuel injectors (44, 46, and 48) to provide a distributed, on-demand fuel supply to each stage of a multistage combustor in a gas turbine engine.

Fuel tank 32, first boost pump 34, FOHE 36, filter 38, and second boost pump 40 are positioned in flow series along main conduit 41. Fuel, such as jet fuel, is stored in tank 32 for use by a gas turbine engine, such turbofan engine 10 aboard an aircraft. First boost pump 34 is located downstream of fuel tank 32 on main conduit 41 and pulls fuel from tank 32 along main conduit 41. In the depicted embodiment, first boost pump 34 is a gearbox driven boost pump that receives rotational input from the gas turbine engine 10. In an alternative embodiment, first boost pump 34 is electrical. FOHE 36 is located downstream of first boost pump 34 on main conduit 41. Within FOHE 36, heat from the engine oil system is commonly rejected to the fuel passing through FOHE 36. Filter 38 is located downstream of FOHE 36 on main conduit 41. Fuel flows through filter 38, which traps particulate matter to clean the fuel. Second boost pump 40 is an optional, additional pump for fuel system 30 located downstream of filter 38 on main conduit 41. A fuel pressure sensor is optionally located downstream of second boost pump 40, on main conduit 41 to sense fuel pressure before fuel flows into the branch conduits.

Just downstream of filter 38 and second boost pump 40, main conduit 41 splits into three branch conduits corresponding to the three stages of multistage combustor 12: first stage conduit 43, second stage conduit 45, and third stage conduit 47. It should be appreciated that more or less stages, as well as more or less fuel injectors per stage, are possible. Each branch conduit 43, 45, 47 includes its own FFMM 42 located between main conduit 41 and fuel injectors 44, 46, 48 in multistage combustor 12. A first portion of fuel flows through first FFMM 42 located on first stage conduit 43 to supply first stage fuel injectors 44. A second portion of fuel flows through second FFMM 42 located on second stage conduit 45 to supply second stage fuel injectors 46. A third portion of fuel flows through third FFMM 42 located on third stage conduit 47 to supply third stage fuel injectors 48. Each FFMM 42 has an input for electric power 50, and both an input and an output for central control 52. Incoming information is received from, and outgoing information is sent to, central control 52. In the depicted embodiment, central control 52 is a full-authority digital electronic engine control (FADEC). Each FFMM 42 exchanges information with central control 52 to independently modulate fuel flow to a plurality of fuel injectors operatively forming single stage of the multistage combustor. A single FFMM 42 is shown and described in detail below with respect to FIG. 3.

Figure 3:
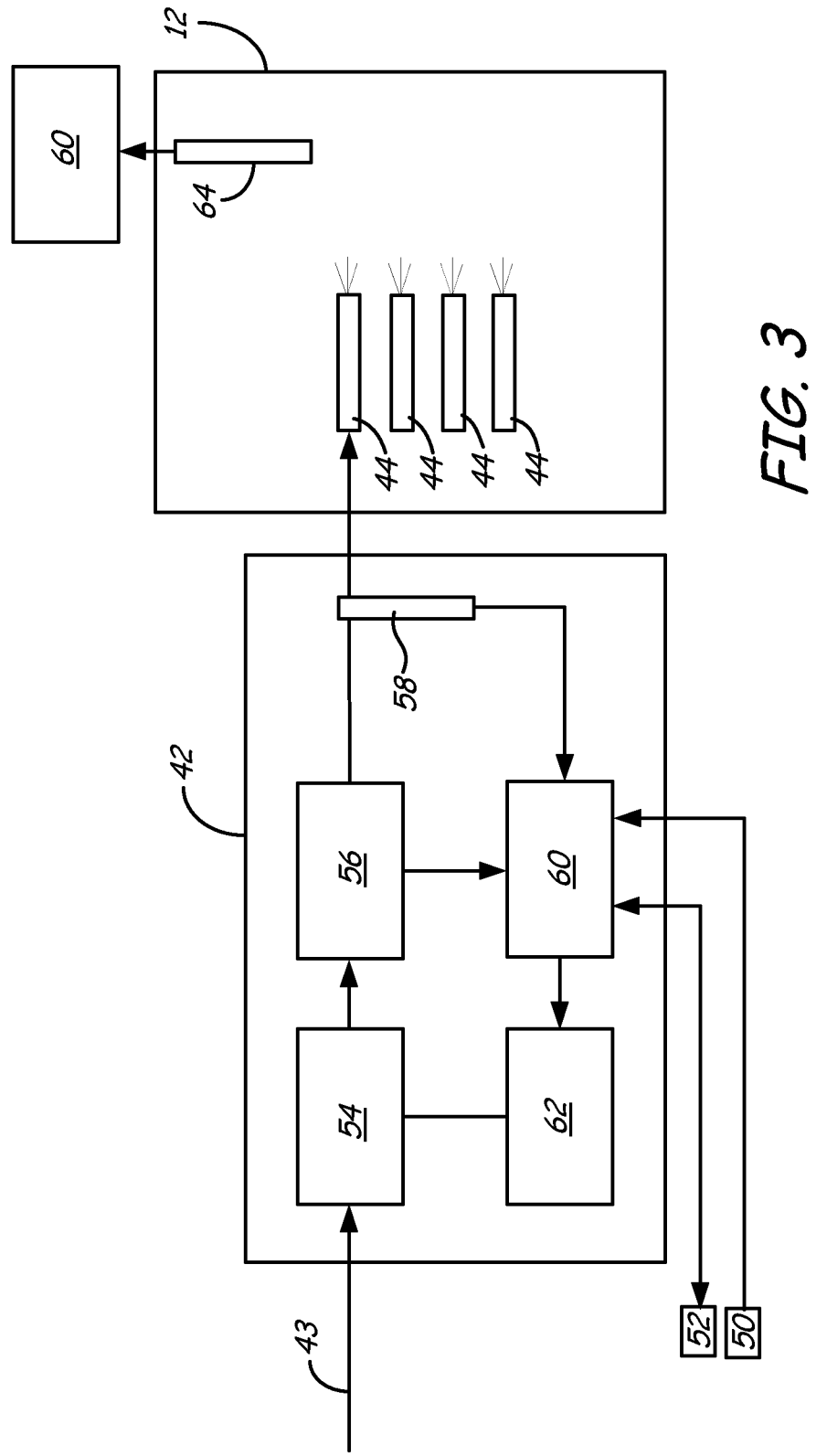
FIG. 3 is a block diagram showing a single fuel flow metering module from FIG. 2.

FIG. 3 is block diagram of first FFMM 42 on first stage conduit 43 associated with first stage injectors 44. Input from energy source 50 and input/output to central control 52 are shown. Also depicted are the components of FFMM 42: pump 54, flow meter 56, first sensor 58, controller 60, and motor 62. Additional second sensor 64 is operationally associated with FFMM 42, but located in multistage combustor 12. First FFMM 42 controls a first portion of fuel flow along first stage conduit 43 to first stage fuel injectors 44, but the discussion below applies generally to all FFMMs 42 described herein.

Fuel flowing along first stage conduit 43 enters first FFMM 42, which includes pump 54, flow meter 56, first sensor 58, controller 60, and motor 62. Upon entering FFMM 42, fuel flows through pump 54. In the depicted embodiment, pump 54 is a positive displacement pump, which pumps fuel to first stage fuel injectors 44. Flow meter 56 is located either downstream or upstream of pump 54, and measures the flow rate of fuel as it flows through pump 54 (mass flow meter or density and volume flow meter). First sensor 58 is located downstream of pump 54 and flow meter 56, and measures the pressure of fuel before it exits FFMM 42 and is sent to first stage fuel injectors 44. Second sensor 64 is located downstream of first stage fuel injectors 44 in multistage combustor 12, and measures the gas pressure of the combustor 12. The sensed flow rate is sent from flow meter 56 to controller 60, and the sensed pressures are sent from first sensor 58 and second sensor 64 to controller 60. Controller 60 receives the sensed flow rate from flow meter 56, the sensed pressures from first sensor 58 and second sensor 64, as well as power 50 and information from central control 52. In the depicted embodiment, motor 62 is a simplex permanent magnet variable speed electric motor that drives fuel pump 54 at a speed determined by controller 60. Controller 60 modulates the speed of motor 62 based on a combination of information received from flow meter 56, and central control 52. First sensor 58 and second sensor 64 (as well as an optional fuel pressure sensor located upstream of first stage conduit 43) are used for monitoring the health of the system.

In operation, central control 52 sends a signal to controller 60 indicating fuel demand for first stage fuel injectors 44 of the multistage combustor. Controller 60 then indicates speed of motor 62 based on desired fuel demand from central control 52. Motor 62 drives pump 54 at the indicated speed, and fuel is sent through flow meter 56, past first sensor 58, and out of first stage fuel injectors 44 into the multistage combustor 12. Information regarding fuel flow from flow meter 56 and pressure from first sensor 58 and second sensor 64 provide feedback to controller 60 regarding fuel flow, fuel pressure, and combustor pressure. The sensed or actual mass flow rate from flow meter 56 is compared to desired fuel flow or demand from control 52 to better modulate the output of pump 54 (via motor 62 speed). Further, the pressure required for a given flow rate is monitored and pressure trend values from first sensor 58 and second sensor 64 are used to detect clogging of first stage fuel injectors 44. Additionally, the speed of motor 62 is monitored to detect pump 54 wear. The pump/motor speed required to produce the necessary flow at a given combination of first sensor pressure and second sensor pressure is compared to recorded values for the new pump to determine the extent of pump wear. If excessive wear is detected, a maintenance message is sent to the central control 52. The information gathered by controller 60, including the health of various components, is sent to central control 52.

When the gas turbine engine is in use, fuel demand is calculated by central control 52. At aircraft takeoff, there is a large fuel demand and central control 52 will activate each stage of the multistage combustor 12 in the proper sequence. In comparison, at cruising altitude, there is less fuel demand and central control 52 will only activate certain stages of the multistage combustor. By providing an independent FFMM 42 for each stage of the multistage combustor 12, the present disclosure provides a distributed, on-demand fuel system that negates the need for problematic modulating staging valves. FFMMs 42 can be activated by central control 52 with variable overlap to fill fuel conduits before fuel flow is needed from the injectors, thereby accounting for "line fill" delays. This line filling can be accomplished by momentarily pumping fuel to fill the line at the maximum flow capability of the pump and simultaneously monitoring motor current to detect filling. Interaction between stages, which can occur when one pump is supplying multiple staging valves is avoided through use of FFMMs 42. A failure in one stage of the multistage fuel system can be detected and remaining stages can be adjusted to compensate for the failure. Additionally, fuel heating is reduced since only the fuel required for combustion is pumped through FOHE 36, thereby enabling greater heat sink capability. Individual control over each fuel flow output by FFMM 42 provides the ability to tailor fuel flow split between each fuel flow output. In an electrically driven demand fuel system with one pump, a dual redundant motor is required to handle the case of a motor failure during flight. This doubles the motor weight on the engine. In the configuration described in this disclosure, redundant motors are not required since a failure of one motor would not stop engine fuel flow and would only have a small impact on the overall engine fuel flow depending on how many pumping systems are incorporated.

Figure 4:
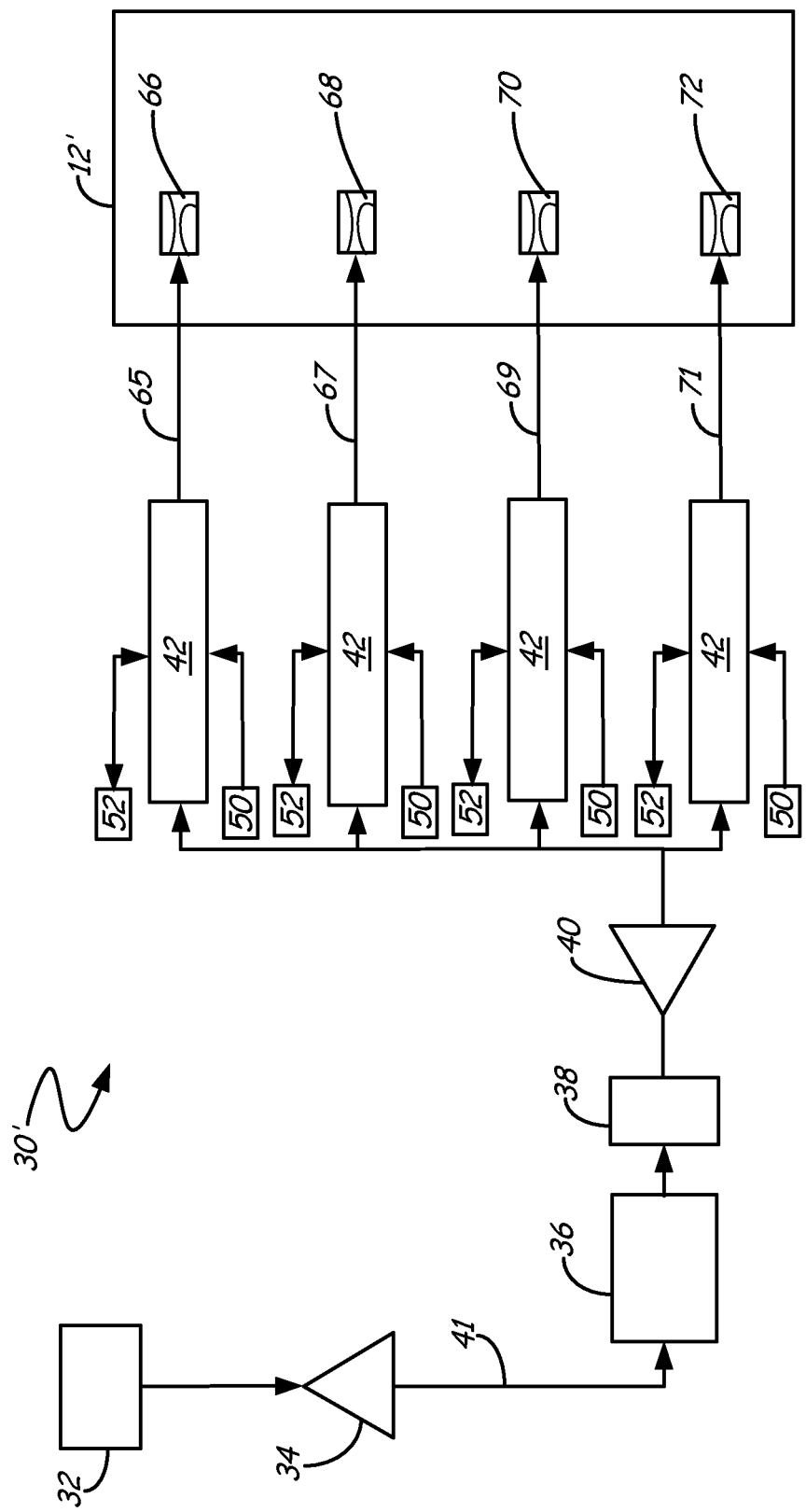
FIG. 4 is a block diagram showing a second embodiment of the fuel distribution system.

FIG. 4 is a block diagram showing a second embodiment of fuel distribution system 30' for multistage combustor 12'. Fuel distribution system 30' is substantially similar to fuel distribution system 30 described above with reference to FIG. 2, and like reference numerals designate like components. Fuel distribution system 30' includes tank 32, first boost pump 34, FOHE 36, filter 38, second boost pump 40, main conduit 41, fuel flow metering modules (FFMMs) 42, electric power 50 input, and central control 52 input/output. Also shown in FIG. 4 are first injector conduit 65, first injector 66, second injector conduit 67, second injector 68, third injector conduit 69, third injector 70, fourth injector conduit 71, and fourth injector 72. The second embodiment of fuel distribution system 30' has one FFMM 42 for each fuel injector 66, 68, 70, 72 to provide a distributed, on-demand fuel supply to each injector 66, 68, 70, 72 of multistage combustor 12' in a gas turbine engine.

Fuel tank 32, first boost pump 34, FOHE 36, filter 38, second boost pump 40, main conduit 41, FFMMs 42, electric power 50 input, and central control 52 input/output operate in the second embodiment of fuel distribution system 30' identically to the first embodiment of fuel distribution system 30 described above with reference to FIG. 2. For the sake of brevity, only the differences between the second embodiment of fuel distribution system 30' and the first embodiment of fuel distribution system 30 will be highlighted.

Just downstream of filter 38 and second boost pump 40, main conduit 41 splits into four branch conduits corresponding to four individual fuel injectors 66, 68, 70, 72 of multistage combustor 12: first injector conduit 65, second injector conduit 67, third injector conduit 69, and fourth injector conduit 71. It should be appreciated that more or less fuel injectors are equally possible. Each branch conduit 65, 67, 69, and 71 includes its own FFMM 42 located between main conduit 41 and individual fuel injector 66, 68, 70, and 72. A first portion of fuel flows through first FFMM 42 located on first injector conduit 65 to supply a single, first fuel injector 66. A second portion of fuel flows through second FFMM 42 located on second injector conduit 67 to supply single, second fuel injector 68. A third portion of fuel flows through third FFMM 42 located on third injector conduit 69 to supply a single, third fuel injector 70. A fourth portion of fuel flows through fourth FFMM 42 located on fourth injector conduit 71 to supply a single, fourth fuel injector 72. Accordingly, each fuel injector 66, 68, 70, and 72 includes its own FFMM 42 on its own feed conduit 65, 67, 69, and 71. In comparison to the first embodiment of fuel distribution system 30, the second embodiment of fuel distribution system 30' provides even greater independence of fuel distribution since each FFMM 42 controls fuel flow to a single fuel injector 66, 68, 70, 72. Fuel injectors 66, 68, 70, and 72 can be coupled in a single fuel nozzle or located in different fuel nozzles within multistage combustor 12'. The second embodiment of fuel distribution system 30' is particularly advantageous for controlling heat distribution around the combustor, known as "combustor pattern factor", by accurately and independently controlling fuel flow to each fuel injector.

Figure 5:
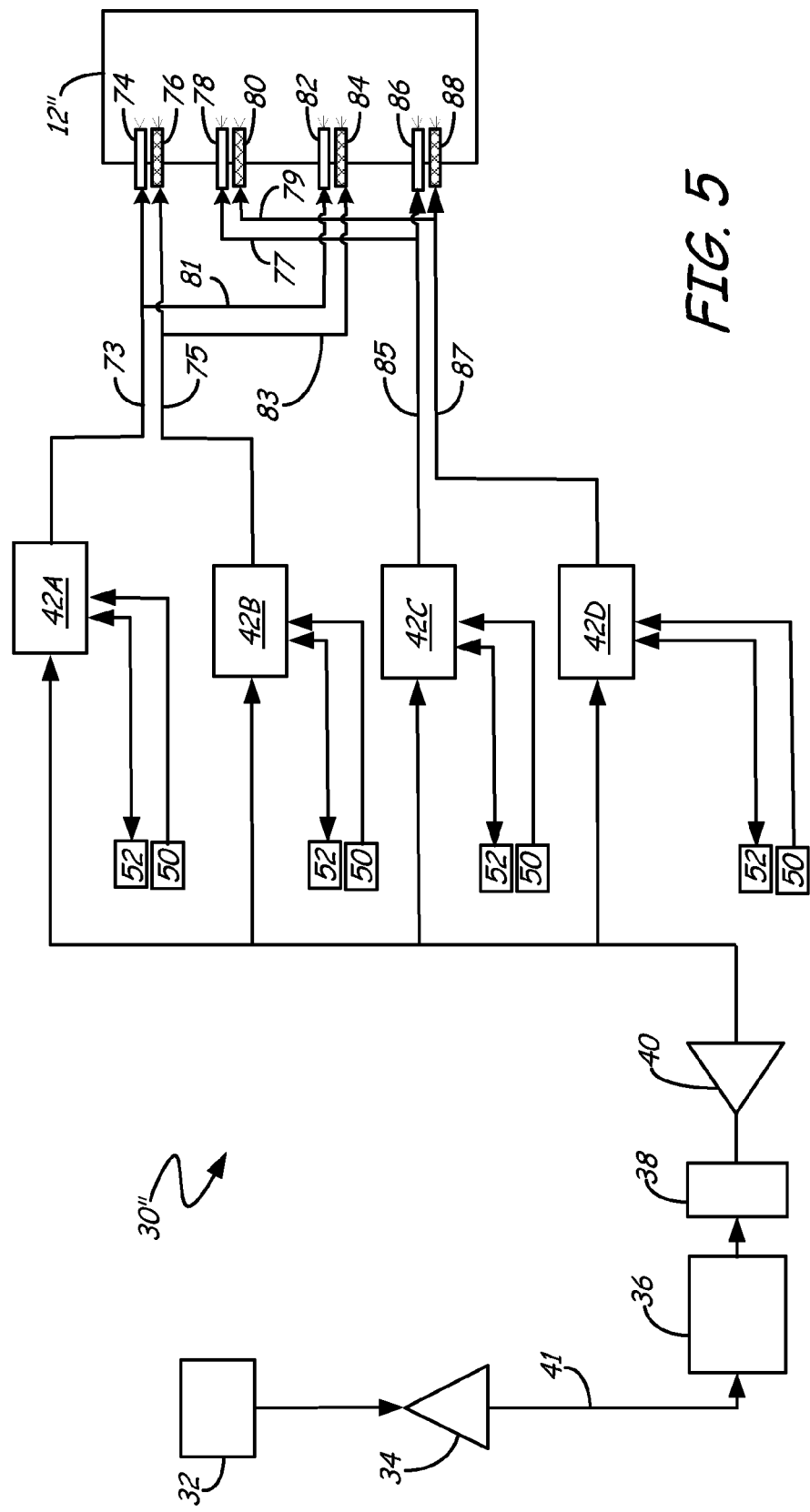
FIG. 5 is a block diagram showing a third embodiment of the fuel distribution system.

FIG. 5 is a block diagram showing a third embodiment of fuel distribution system 30". Fuel distribution system 30" is substantially similar to fuel distribution system 30' described above with reference to FIG. 4 and fuel distribution system 30 described above with reference to FIG. 2, and like reference numerals designate like components. Fuel distribution system 30" includes tank 32, first boost pump 34, FOHE 36, filter 38, second boost pump 40, main conduit 41, fuel flow metering modules (FFMMs) 42A-42D, electric power 50 input, and central control 52 input/output. Also shown in FIG. 4 are branch conduits 73, 75, 77, 79, 81, 83, 85, and 87, as well as fuel injectors 74, 76, 78, 80, 82, 84, 86, and 88. Fuel distribution system 30" has two FFMM 42 for each stage of multistage combustor 12" to provide a distributed, on-demand fuel supply to the two stages of multistage combustor 12" in a gas turbine engine.

Fuel tank 32, first boost pump 34, FOHE 36, filter 38, second boost pump 40, main conduit 41, FFMMs 42, electric power 50 input, and central control 52 input/output operate in the third embodiment of fuel distribution system 30" identically to the second embodiment of fuel distribution system 30' described above with reference to FIG. 4 and first embodiment of fuel distribution system 30 described above with reference to FIG. 2. For the sake of brevity, only the differences between the third embodiment of fuel distribution system 30" and the first and second embodiments of fuel distribution system 30, 30' will be highlighted.

Just downstream of filter 38 and second boost pump 40, main conduit 41 splits into four branch conduits corresponding to four FFMMs 42A-42D. Each FFMM 42A-42D is located between main conduit 41 and multistage combustor 12" and controls fuel supply for half of a stage of multistage combustor 12" (two of four fuel injectors operatively grouped into a stage). It should be appreciated that more or less FFMMs 42, as well as more or less stages, fuel injectors per stage, and fuel nozzles are equally possible. First stage injector 74 and second stage injector 76 are located in a first spray nozzle, while first stage injector 82 and second stage injector 84 are located in a second spray nozzle. A first portion of fuel flows through first FFMM 42A located on branch conduit 73. Downstream of FFMM 42A, branch conduit 73 feeds fuel to first stage injector 74, and branch conduit 81 splits off from branch conduit 73 to feed fuel to first stage injector 82 located in a different spray nozzle. A second portion of fuel flows through second FFMM 42B located on branch conduit 75. Downstream of FFMM 42B, branch conduit 75 feeds fuel to second stage injector 76, and branch conduit 83 splits off from branch conduit 75 to feed fuel to second stage injector 84 located in a different spray nozzle.

First stage injector 78 and second stage injector 80 are located in a third spray nozzle, while first stage injector 86 and second stage injector 88 are located in a fourth spray nozzle. A third portion of fuel flows through third FFMM 42C located on branch conduit 85. Downstream of FFMM 42C, branch conduit 85 feeds fuel to first stage injector 86, and branch conduit 77 splits off from branch conduit 85 to feed fuel to first stage injector 78 located in a different spray nozzle. A fourth portion of fuel flows through fourth FFMM 42D located on branch conduit 87. Downstream of FFMM 42D, branch conduit 87 feeds fuel to second stage injector 88, and branch conduit 79 splits off from branch conduit 87 to feed fuel to second stage injector 80 located in a different spray nozzle.

In the embodiment of FIG. 5, fuel flow to the first stage of multistage combustor 12" (including fuel injectors 74, 78, 82, and 86) is controlled equally by two FFMMs 42A and 42C. Similarly, fuel flow to the second stage of multistage combustor 12" (including fuel injectors 76, 80, 84, and 88) is controlled equally by two FFMMs 42B and 42D. This third embodiment of fuel distribution system 30" is a middle ground between the first embodiment of fuel distribution system 30 (one FFMM per stage) and the second embodiment of fuel distribution system 30' (one FFMM per fuel injector) in that each FFMM 42 controls fuel flow to half of a stage of multistage combustor 12" (e.g. two of four fuel injectors for a stage in the depicted embodiment). Fuel distribution system 30" results in improved thermal management and engine efficiency. Further, fuel distribution system 30" can accommodate for failure of any one FFMM 42 and therefore, redundant motor or pumping architectures are not required.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for a gas turbine engine having an electronic engine control, the fuel system comprising:
   a plurality of fuel injectors grouped by stages in a multistage combustor;
   a first fuel flow metering module on a first conduit for controlling a first fuel output to a first plurality of fuel injectors in a first portion of a first stage of the multistage combustor;
   a second fuel flow metering module on a second conduit for controlling a second fuel output to a second plurality of fuel injectors in a second portion of the first stage of the multistage combustor, wherein operation of the first fuel flow metering module is independent of operation of the second fuel flow metering module;
   each fuel flow metering module including:
      a positive displacement pump for pumping fuel;
      a flow meter for measuring fuel flow;
      a first pressure sensor for sensing fuel pressure;
      a controller for receiving and analyzing information regarding fuel flow from the flow meter, fuel pressure from the first pressure sensor, and fuel demand from the electronic engine control; and
      an electric motor for driving the positive displacement pump in accordance with a signal received from the controller to modulate fuel output for the fuel flow metering module.

2. The fuel system of claim 1 wherein for each fuel flow metering module, the positive displacement pump is located downstream of a boost pump and upstream of at least one fuel injector.

3. The fuel system of claim 1, wherein for each fuel flow metering module, the flow meter measures fuel flow through the positive displacement pump.

4. The fuel system of claim 1, wherein for each fuel flow metering module, the first pressure sensor senses pressure of fuel downstream of the positive displacement pump.

5. The fuel system of claim 1, further comprising:
   a second pressure sensor for sensing combustor pressure near at least one fuel injector.

6. The fuel system of claim 1, further comprising:
   a third fluid flow metering module located on a third fuel distribution conduit for controlling a third fuel output to a third plurality of fuel injectors in an entire second stage of the multistage combustor, wherein operation of the third fuel flow metering module is independent of operation of the first and second fuel flow metering modules.

7. The fuel system of claim 1, further comprising:
   a third fuel flow metering module on a third conduit for controlling a third fuel output to a third plurality of fuel injectors in a first portion of a second stage of the multistage combustor; and
   a fourth fuel flow metering module on a fourth conduit for controlling a fourth fuel output to a fourth plurality of fuel injectors in a second portion of the second stage of the multistage combustor, wherein operation of the third fuel flow metering module is independent of operation of the fourth fuel flow metering module.

8. The fuel system of claim 1, wherein:
   the first fuel flow metering module on the first conduit controls the first fuel output to a first, singular fuel injector; and
   the second fuel flow metering module on the second conduit for controlling the second fuel output to a second, singular fuel injector.

9. A fuel system for a gas turbine engine comprising:
   a fuel tank;
   a boost pump downstream of the fuel tank;
   a fuel/oil heat exchanger downstream of the boost pump;
   a filter downstream of the fuel/oil heat exchanger;
   a multistage combustor downstream of the filter, the multistage combustor having fuel injectors located in fuel nozzles and operatively organized into stages; and
   a plurality of fuel flow metering modules located downstream of the filter and upstream of the multistage combustor, the plurality of fuel flow metering modules configured to control fuel output to one or more fuel injectors in the multistage combustor, wherein the plurality of fuel flow metering modules operate independently of one another; the plurality of fuel flow metering modules including:
      a first fuel flow metering module for controlling a first fuel output to a first plurality of fuel injectors in a first portion of a first stage of the multistage combustor; and
      a second fuel flow metering module for controlling a second fuel output to a second plurality of fuel injectors in a second portion of the first stage of the multistage combustor.

10. The fuel system of claim 9, wherein the first fuel flow metering module controls the first fuel output to a first, single fuel injector in the first stage of the multistage combustor.

11. The fuel system of claim 10, further comprising:
   a third fuel flow metering module for controlling a third fuel output to a third, single fuel injector in a second stage of the multistage combustor.

12. The fuel system of claim 11, wherein the first fuel injector and the third fuel injector are located in the same fuel nozzle of the multistage combustor.

13. The fuel system of claim 9, wherein the first plurality of fuel injectors are each located in different fuel nozzles.

14. The fuel system of claim 13, further comprising:
   a third fuel flow metering module for controlling a third fuel output to a third plurality of fuel injectors in a second stage of the multistage combustor, the third plurality of fuel injectors each located in different fuel nozzles.

15. The fuel system of claim 9, further comprising:
   a pressure sensor located at the multistage combustor.

* * * * *